US005940809A

United States Patent [19]

Musmanno et al.

[11] Patent Number: 5,940,809
[45] Date of Patent: Aug. 17, 1999

[54] SECURITIES BROKERAGE-ASSET MANAGEMENT SYSTEM

[75] Inventors: Thomas E. Musmanno, Warren; Stephen C. Leftly, Glen Gardner; Robert Fong, East Brunswick; Patrick K. Kane, Belle Mead, all of N.J.

[73] Assignee: Merrill Lynch & Co., New York, N.Y.

[21] Appl. No.: 08/699,648

[22] Filed: Aug. 19, 1996

[51] Int. Cl.⁶ .................................................. G06F 17/60
[52] U.S. Cl. ............................ 705/35; 235/379; 707/104
[58] Field of Search ............................... 235/379; 705/35, 705/36, 37; 707/9, 104

[56] References Cited

U.S. PATENT DOCUMENTS

| | | | |
|---|---|---|---|
| 4,346,442 | 8/1982 | Musmanno | 705/36 |
| 4,376,978 | 3/1983 | Musmanno | 705/36 |
| 4,597,046 | 6/1986 | Musmanno | 705/36 |
| 4,774,663 | 9/1988 | Musmanno | 705/36 |
| 5,421,011 | 5/1995 | Camillone et al. | 395/674 |
| 5,481,735 | 1/1996 | Mortensen et al. | 395/200.76 |
| 5,546,523 | 8/1996 | Gatto | 345/352 |
| 5,740,427 | 4/1998 | Stoller | 707/104 |
| 5,761,647 | 6/1998 | Boushy | 705/10 |
| 5,768,519 | 6/1998 | Swift et al. | 395/200.53 |

OTHER PUBLICATIONS

Merrill Lynch & Company "Architecture User Manual" CMA Rearchitecture Group, May 1994.

*Primary Examiner*—Edward R. Cosimano
*Attorney, Agent, or Firm*—Hopgood, Calimafde, Kalil & Judlowe, LLP

[57] ABSTRACT

A central asset management system is provided having a central reference facility for coordination of all transaction processing. For each customer, a unique identifier (UID) is assigned as a stable, semi-permanent tag. The UID is then used for subsequent processing relating to that customer, even with multiple customer accounts, rather than individual transaction numbers for each process. Use of the UID is facilitated through a front end processor that handles all incoming external transaction data and converts it into a usable format, cross-referenced with the appropriate UID. Use of the UID reduces the overall variability and number of transaction identifiers, thus increasing efficiency and simplifying all aspects of the system. The system makes other simplifying uses of the UID, for example, as a key for segregating the transaction processes into different processing areas to be performed simultaneously. Once processed, transactions are converted back into the necessary formats usable by various external systems by a back end processor.

9 Claims, 8 Drawing Sheets

SECURITIES BROKERAGE-ASSET MANAGEMENT SYSTEM

FIELD OF THE INVENTION

The present invention relates generally to a system and processes for implementing financial management, and more specifically, to a data processing system for managing a plurality of financial accounts in an enhanced and integrated manner.

BACKGROUND OF THE INVENTION

There has been an explosive growth of financial investment tools, linked for the most part with the corresponding need to assess and manage a plurality of assets and liabilities in a coherent manner. This need exists across the spectrum; not only by the more experienced investor, but also by the younger, newer investor now expected to manage his own retirement and savings needs. Indeed, it is becoming clearer that individuals will be shouldering a larger portion of their future obligations in terms of health and retirement. This future responsibility can only be adequately addressed by reliance on a variety of investment and debt vehicles.

As the complexities of central asset management have grown, various systems have been developed to support individual management of capital assets. There has been a corresponding growth in the software systems capable of handling the vast amounts of transactional data associated with individual asset and debt management. Of these, the single most versatile and best known central asset management system is the Cash Management Account®, known as the CMA® brokerage account, offered by the assignee of the present invention. The CMA® account came into existence several years ago, offering account holders the ability to integrate a brokerage account with a debit card and check writing capabilities, while providing extensive computer automated services, such as sweeping idle funds into short term investment accounts (money markets).

The original CMA® account system represented a breakthrough in data processing as it allowed precise account management of both debt and asset obligations in an efficient integrated manner. The software underlying the CMA® accounts permitting its successful operation is a subject of four separate patents: U.S. Pat. Nos. 4,346,442 to Musmanno; 4,376,978 to Musmanno; 4,597,046 to Musmanno, et al.; and 4,774,663 to Musmanno, et al.

These four patents are hereby incorporated by reference.

With the explosive growth of the CMA® account and other central asset management offerings, the amount and complexity of data processing has expanded at an astronomical rate. As more financial institutions entered the field with central asset management accounts of their own design, many attempts were made to differentiate the various offerings by adding features or account flexibility. These alterations reflect expressions too numerous to even outline here; however, the original central asset management account as envisioned a decade ago has transcended to a new plane. By doing so, the overall data processing approach undertaken with the original product had to be revisited. The expanded services and integration with other brokerage activities as processed within the original data processing framework created an unwieldy and difficult mechanism for managing the new systems. A reevaluation highlighted an opportunity to add system flexibility to central asset management processing by undertaking the data processing in a fundamentally different manner. Several advances were realized in this effort and represent the focus of the instant application for patent.

SUMMARY AND OBJECTS OF THE PRESENT INVENTION

It is an object of the present invention to provide an enhanced data processor for managing a plurality of accounts directed to select assets and liabilities.

It is an additional object of the present invention to provide an asset management program that incorporates a unique ID code for each customer as a stable processing label for processing of transactions.

It is another object of the present invention to provide an asset management program that is seamlessly integrated with various external account management systems.

It is a further object of the present invention to provide an asset management system that provides substantial and flexible point of contact processing to decrease the amount of transactional data handled by centralized processors and thereby increase the overall efficiency of the system.

It is yet another object of the present invention to provide an asset management system that is capable of handling larger amounts of transactional data using concurrent processing.

It is a still further object of the present invention to provide an asset management system with greater online and batch processing capabilities to increase efficiency and provide access to updated account information in a more timely fashion.

In accordance with the objects of the invention, a central asset management system is provided having a central reference facility for coordination of all transaction processing. For each customer, a unique identifier (UID) is assigned as a stable, semi-permanent tag. The UID is then used for subsequent processing relating to that customer, even with multiple customer accounts, rather than individual transaction numbers for each process. Use of the UID is facilitated through a front end processor that handles all incoming external transaction data and converts it into a usable format, cross-referenced with the appropriate UID. Use of the UID reduces the overall variability and number of transaction identifiers, thus increasing efficiency and simplifying all aspects of the system. The system makes other simplifying uses of the UID, for example, as a key for segregating the transaction processes into different processing areas to be performed simultaneously. Once processed, transactions are converted back into the necessary formats usable by various external systems by a back end processor.

The combination of the front and back ends, coupled with use of the internal UID, achieves seamless integration with other systems within the financial institution, as well as those customers and other institutions transacting with the financial institution.

The system further enhances efficiency by allowing transactions to be initiated directly at the branches, rather than being mirrored to a service area. This increased, distributed functionality increases overall productivity of the system and reduces processing time for transactions, since they may be initiated as soon as requested. Improved internal processing capabilities also allow complete posting and record-keeping tasks to be accomplished in significantly less time, and in some cases in real-time in an online environment. Combining this enhanced posting with branch functionality makes the overall system more responsive to customer requests and transactions.

The system is also more flexible and responsive to the needs of both customers and financial institution personnel. By maintaining parameters relating to such considerations as fraud protection and credit overdrafts in dynamic tables, financial institution users with proper authorization can alter such parameters using a user-friendly system in an online mode. This eliminates the need for programmers to rewrite code whenever changes in the parameters are desired. This feature gives the system practically unlimited flexibility to handle different access, protection and other parameters for each account, even for different accounts for a single customer, and to vary those parameters based on seasonal fluctuations or other needs.

BRIEF DESCRIPTION OF THE DRAWINGS

The foregoing and other objects and advantages will become apparent to those skilled in the art upon reading the following detailed description of the preferred embodiments in conjunction with a review of the appended drawings, in which.

DETAILED DESCRIPTION OF THE PREFERRED EMBODIMENTS

Figure 1:
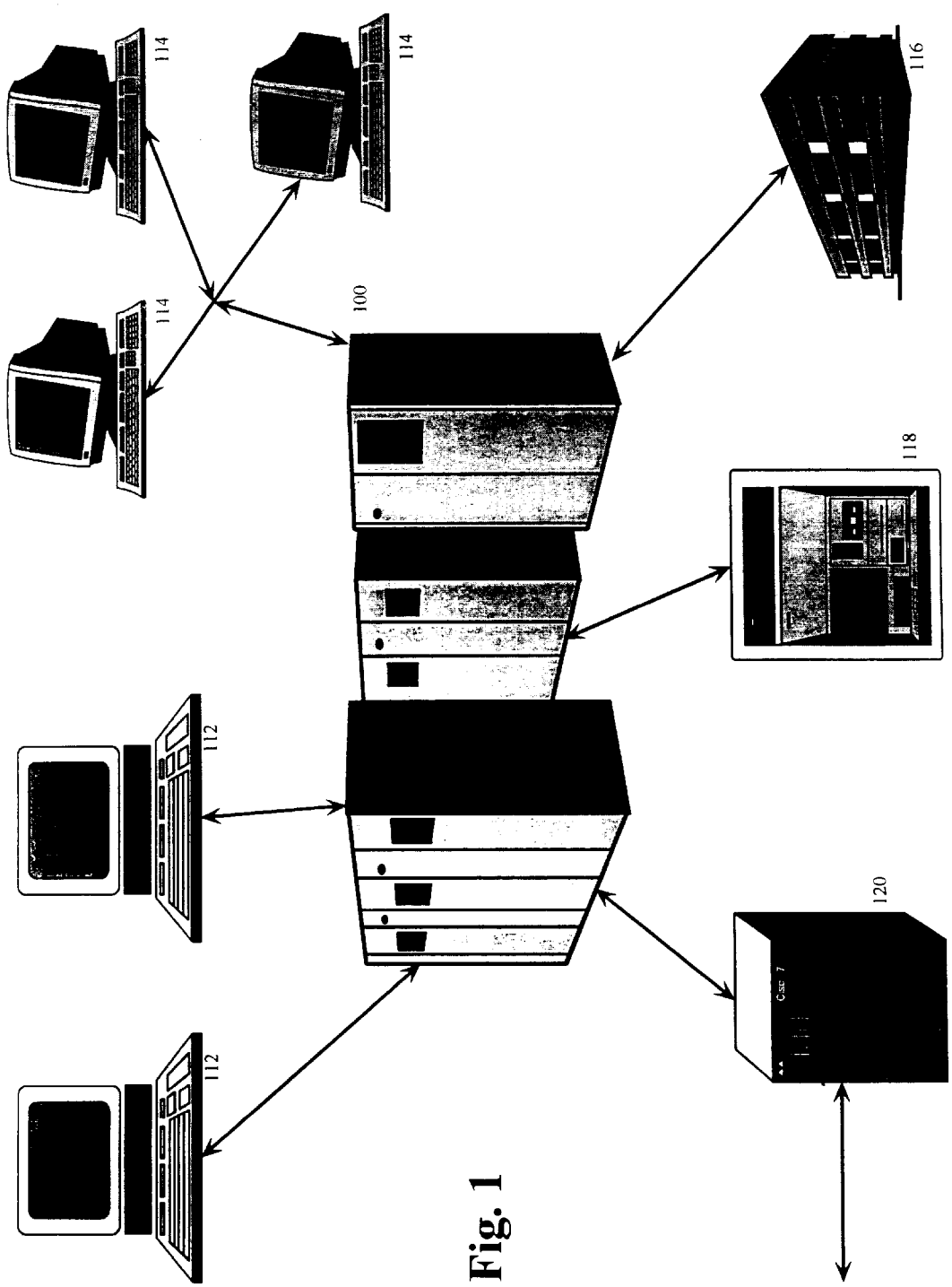
FIG. 1 is a schematic of the preferred embodiment of the present invention.

Referring now to FIG. 1, an overall hardware schematic of the system of the preferred embodiment is shown. This schematic is simplified with respect to the size and number of the various components, but the overall connectivity scheme is represented. The majority of the system resides in a mainframe computer environment, preferably an IBM 3390 system (block 100). Connected to the mainframe, but within the financial institution ("FI") operating system are various dumb terminals (112) for FI personnel to access the system as needed. Users at remote FI branches have terminals (114) connected to a network, which is in turn connected to the mainframe system (100) to access the present system.

The mainframe (100) is also connected to the network (120) within the FI for transferring data with other FI departments. Further connections exist to other financial institutions (116), such as banks and debit/credit card networks (which is the subject of the example discussed below). These other institutions may transfer data to or from the present system and often avoid intervention by FI personnel to carry out transactions and authorizations. Direct access to the mainframe may also be achieved through ATM machines (118) and networks.

Figure 2:
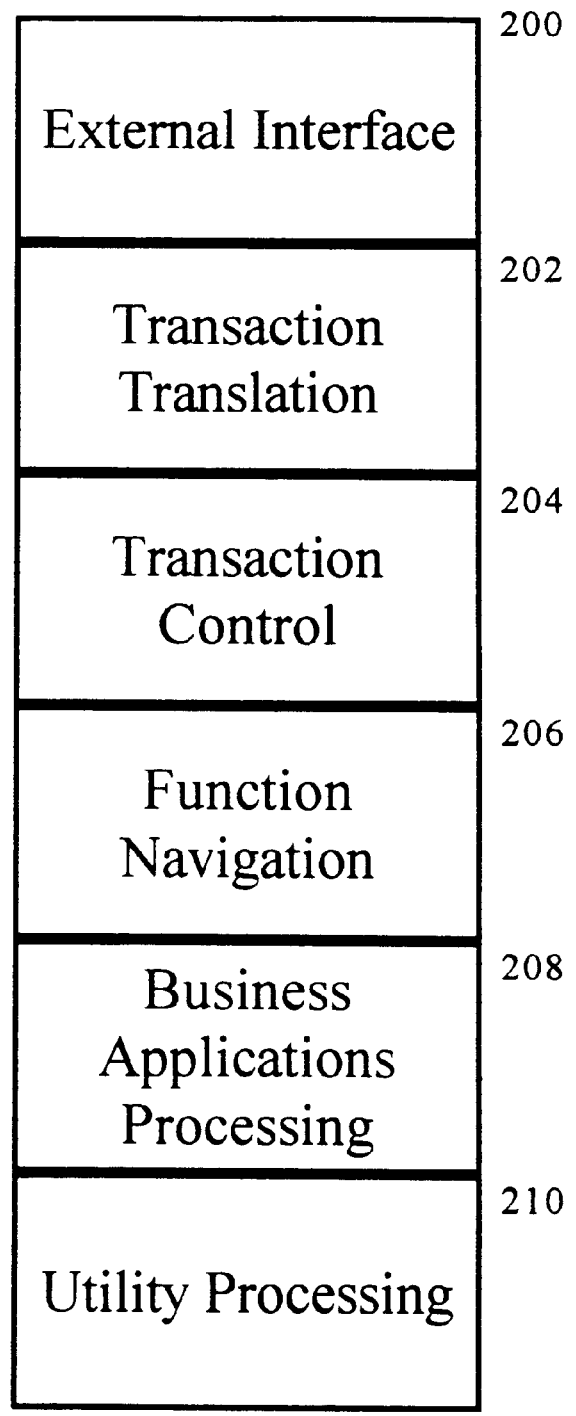
FIG. 2 is a schematic of the layers of the system of the present invention.

One of the elements of the present system is the isolation of the system from external sources, including protection against variability in the data formats and processes of the external systems. With reference to FIG. 2, almost every transaction that is processed by the system will flow through the following system architecture layers:

1. External Interface (200)
2. Transaction Translation (202)
3. Transaction Control (204)
4. Function Navigation (206)
5. Business Application Processing (208)
6. Utility Processing (210)

One transaction process that does not pass through these layers is, for example, a debit card authorization request. Because the debit card network requires a response in a matter of a few seconds, only minimum necessary databases and processes are accessed in an online mode. The resulting financial transaction is, however, processed through the layers of the system.

The system layers will be discussed briefly and some of the components will be expanded upon as follows.

External Interface (200)

This layer insulates business application from external dependencies. A front-end portion of the layer serves as an entry point for transactions into the system. These transactions are usually created by external agents (such as Banc One and VISA) in non-FI format. Back-end portions serve as the various exit points from the FI system, such as when processed data is sent to an external system.

Transaction Translation (202)

This layer provides a method of converting inbound data into standard transactions for processing by the business applications and converting outbound data into desired external formats. This layer includes a variable transaction reformatter that converts an external format to a standard format or vice versa.

Transaction Control (204)

Figure 3:
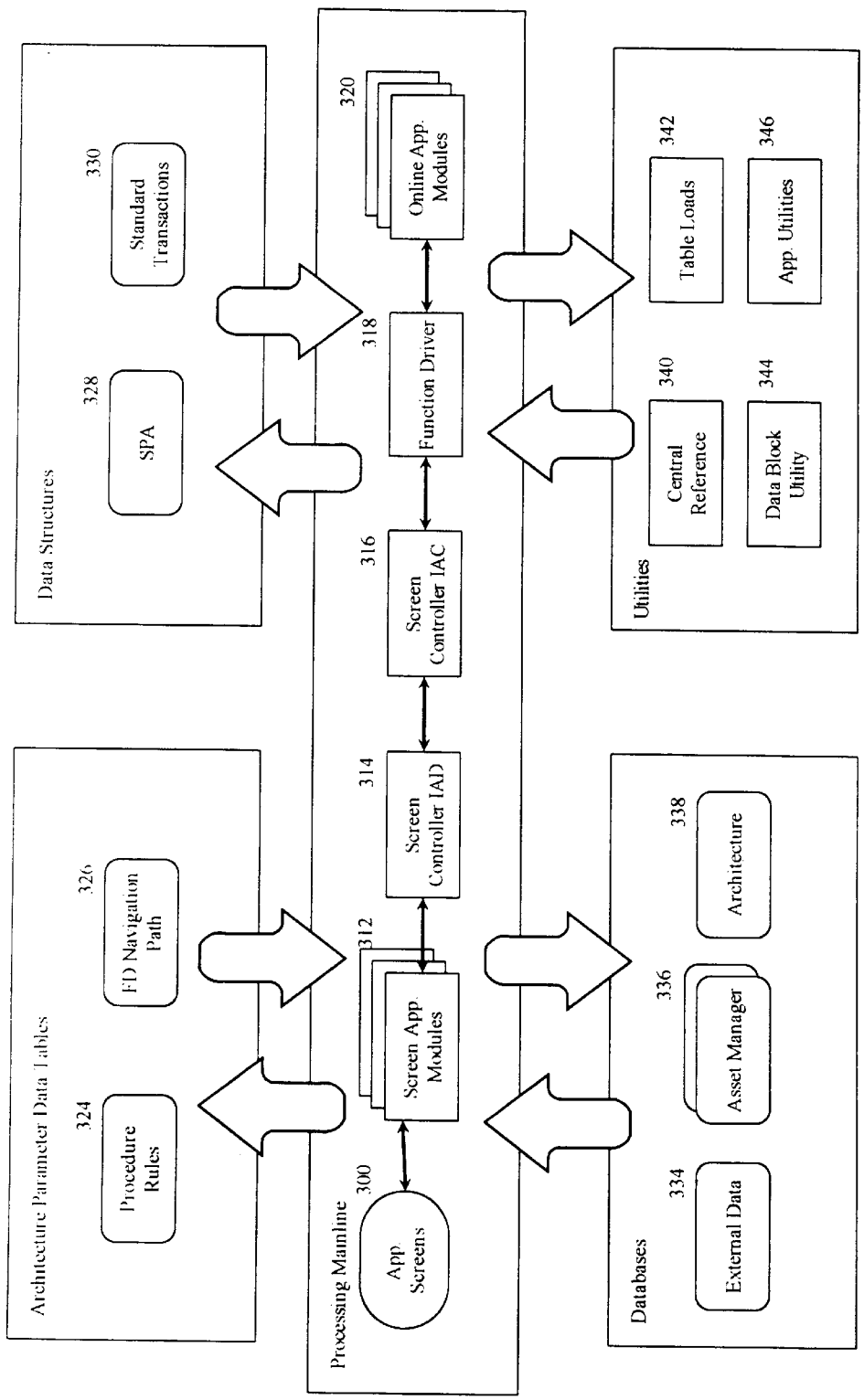
FIG. 3 is a schematic of the online operating environment of the system of the present invention.

This layer acts as a traffic cop, isolating the input transaction management from the business applications. The layer manages either screen input in the online mode or "batched" input in the batch mode, and further manages the navigation layer, passing it a single transaction at a time. With reference to FIG. 3, this layer includes the following components:

Screen Controller IAD (Interactive Application Driver) (314) - This is an online module that allows the user to navigate from one screen to another and to interface with the IAC, described below.

Screen Controller IAC (Interactive Application Controller) (316) - This online module is responsible for controlling online transaction processing, commits and rollbacks. A commit is the actual writing of transaction information to the appropriate databases. Normally, transaction information is temporarily stored until a sufficient number of transactions has occurred to make the writing process more efficient. A rollback occurs when an error is encountered in one of the writing processes and the affected databases are restored to their previous state.

Batch Controller (BC) - This batch component is responsible for controlling batch transaction processing, restart/recovery, commits and rollbacks.

Function Navigation (FIG. 2, 206)

This layer determines a transaction's processing path or sequence of business applications to be executed. Paths or sequences are determined by tables which list the paths for various standard transactions. Various drivers (FIG. 3, 318 for example) are included for handling both online and batch transactions through the business applications. These drivers access the function driver navigation path table (326) to retrieve the selected path for a given transaction type.

Business Application Processing (FIG. 2, 208)

These layers perform the actual business functions, such as transferring funds and account maintenance. These layers are also capable of creating standard transactions whenever necessary to complete a transaction. With reference to FIG. 3, the layers include the following modules:

Screen Application Modules (SAM) (312), which are screen handlers that display screens and accept data entered by the user.

Online Application Modules (OAM) (320), which perform business functions such as name and address table updates and new account openings.

File Control Batch Application Modules (FCBAM), which read batch input files.

Batch Application Modules (BAM), which perform business functions, such as embossing and check reorders.

Utility Processing (FIG. 2, 210)

The utility processing layer includes components that support the main transaction processes. For example, the report utility, described below, and dates utility (346), which is used to access system dates, are included in this layer.

FIG. 3 illustrates the components of the online transaction environment for the system, as well as the interrelationship between these components. The system, which can also be operated in a batch mode instead of an online mode, will now be described in the context of a standard transaction.

Standard Transactions

In previous systems, transactions handled by various systems used data formats that varied from transaction to transaction, with identifying numbers being created to convey information as well as identify the transaction. For example, an external number from an external system might have included certain digits to identify the customer, other digits to identify the type of transaction, other digits to identify the branch at which the transaction is processed and so on. This virtually guaranteed that each identifier would be unique and would require decompilation before any processing could be performed. Also, at each stage of processing, the identifying numbers would have to be cross-referenced with the particular database to which it referred. With multiple account types and accounts and resulting multiple databases which could be scattered across various servers within the FI network, the task of constantly matching the ID numbers with the correct database was a slow, redundant processing burden.

To alleviate the processing burden, the present system utilizes standard transaction formats in conjunction with a unique identifier (UID) to streamline and simplify all transaction processing. Transactions that are generated within the system, such as reconciliation, are created in the standard format to avoid any conversion. Transaction data from outside the system will often not be in the standard format for the system and will be converted upon receipt. The system includes a transaction formatter module to convert external data into standard transactions and then to convert the processed data back into the desired format. The various types of standard transactions are maintained in a standard transactions table (330) that may be updated as needed to accommodate new types of accounts and transactions.

Once converted by the formatter module, a standard transaction consists of three main sections: a control section, a common section and an application specific section. The control section is used to identify the standard transaction. The fields in this section are Format, Type, Action and Sequence Number. These fields are used to organize transactions into logical groupings. The Sequence Number field is used when transactions with similar Format, Type and Action values are on a sequential file in order to uniquely identify them. These fields, when combined with a Business Function, are used by the system to determine a path to process the transactions.

The common section contains data such as the UID, external number and type used to obtain the FI and/or debit card number. These fields do not vary and are common to every standard transaction, although the values will differ. The application specific section contains the actual business data for which the transaction is intended. For example, this data might include the amount of a debit card purchase in a transaction.

Central Reference Facility and UID

The central reference 340 utility shown in FIG. 3 may be implemented by a central reference facility 400 (FIG. 4) which utilizes the UID. The UID is a basic concept of the system which assigns a distinct number to each FI customer. It is a stable, non-changing identifier used as a key to access data in the application database tables. All customer processing within the central asset management system is performed against data stored under this UID.

All transactions coming from external sources will carry the external system's account number. This external account number must be cross referenced to a customer's UID before the transaction can be processed. Likewise, any standard transaction will carry the Customer's UID. This number must be cross-referenced to an external account number before the transaction is converted and sent to an external system.

Figure 4:
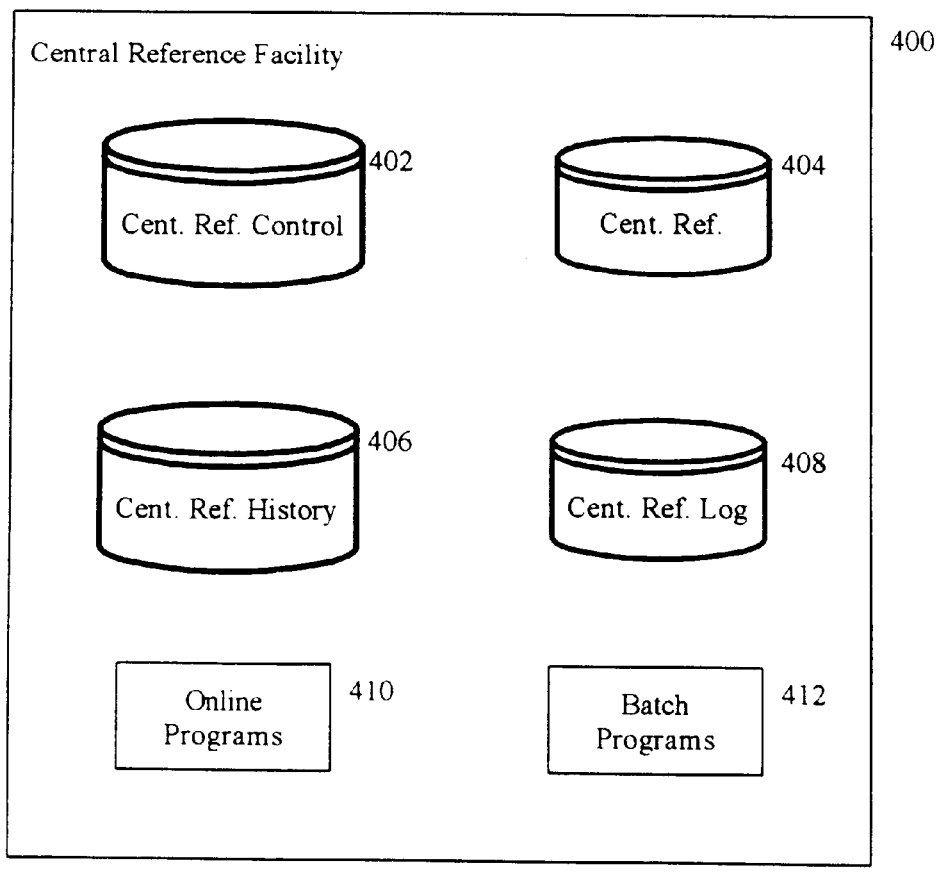
FIG. 4 is a schematic of the central reference facility of the present system.

The UID is an integer sequentially assigned by a module controlling the assignment process. Although no specific information can be gained from looking at the UID, it acts as an anchor for external numbers susceptible to change. As shown in FIG. 4, the Central Reference Facility (CRF) (400) stores the relationships between the external numbers and the UIDs. It consists of four tables, and several online and batch programs that maintain these tables. The tables are Central Reference Control (402), Central Reference (404), Central Reference History (406), and Central Reference Log (408). The Central Reference Control table (402) serves as a control mechanism for assigning new UIDs. It contains the next available UID, the highest UID allowed today and the maximum number of UIDs that can be assigned each day. The maximum number of new UIDs per day is set to avoid any errors, such as endless loops, from generating a huge number of false UIDs.

The Central Reference table (404) is the cross referencing table. It contains one row per UID and External Number and External Number type (debit card type, FI, Check, etc). There can be several external numbers assigned to the same customer; therefore, there may be several rows in the table for a single UID. The table also contains the status of the external number, and effective, assignment and end dates, among other fields. The Central Reference History table (406) will contain all the before images of rows changed or deleted on the Central Reference Table (404).

The Central Reference Log table (408) will contain the after images of rows added or changed on the Central Reference Table (404). For deleted rows, it will contain the primary key of the row. The CRF programs (online programs (410) and batch programs (412)) provide for addition, deletion and changes to Central Reference Table (404). However, all inquiries against the Central Reference Facility (CRF) (400) are performed directly in the Application programs. Interface to CRF is essentially the same in both the online and batch environments.

Application programs that need to perform maintenance (add, change or delete) to the Central Reference table call (batch) or link (online) to the Central Reference Control (402), which edits the data passed and then calls or links to the appropriate subroutine—add, change or delete—based on the type of request.

An example of how the UID improves the processing capabilities of the system, as well as other improvements, will be highlighted in the following example of a complete transaction from authorization to settlement.

Other online components

In the online environment shown in FIG. 3, the processing mainline interacts with the user through the application screens (300). In this way, users at remote sites may initiate transactions and fully interact with the system. In addition to components discussed above, a component the contributes to the efficient processing of the system is the standard pass area (SPA) (328), which is the data area used for communication between the system modules. While in previous systems, data flowed from process to process by being copied from file to file, the SPA (328) is a temporary buffer that lasts for the life of the transaction and is immediately passed from process to process, as needed. This results in shorter processing times. The main storage area used for processing SPAs and other transfers of data is acquired and managed by a data block utility module (344). This module (344) permits one module of the system to pass or get data from another program. In handling SPAs (328), the system also accesses the procedure rules data table (324), which includes information such as the order in which transactions found in the SPA should be processed. When information is needed from a data table, the table loads utility (342) is implemented.

In processing transactions, the system accesses various financial databases including customer accounts and parameters for those accounts, which are all grouped as asset manager database (336), external data (334), and architecture (338). Many of these databases are discussed below in connection with the authorization example.

An example

As an example of the operation of the various layers of the system, as well as the modules and subroutines within those layers, a transaction will be described and followed from initiation to final settlement. In this example, a debit card transaction will be shown and described in connection with FIGS. 5 through 8. It is to be understood that this example is not in any way intended to, nor does it, encompass all of the various transactions and processes that may take place with respect to a transaction. For example, this example does not involve the transfer or sale of any stocks or other equities. Thus, while this example is illustrative of many of the processes of the system, it is merely one example of many that may be described in accordance with the present invention and specification.

Stage 1—Initiation and Authorization

Figure 5:
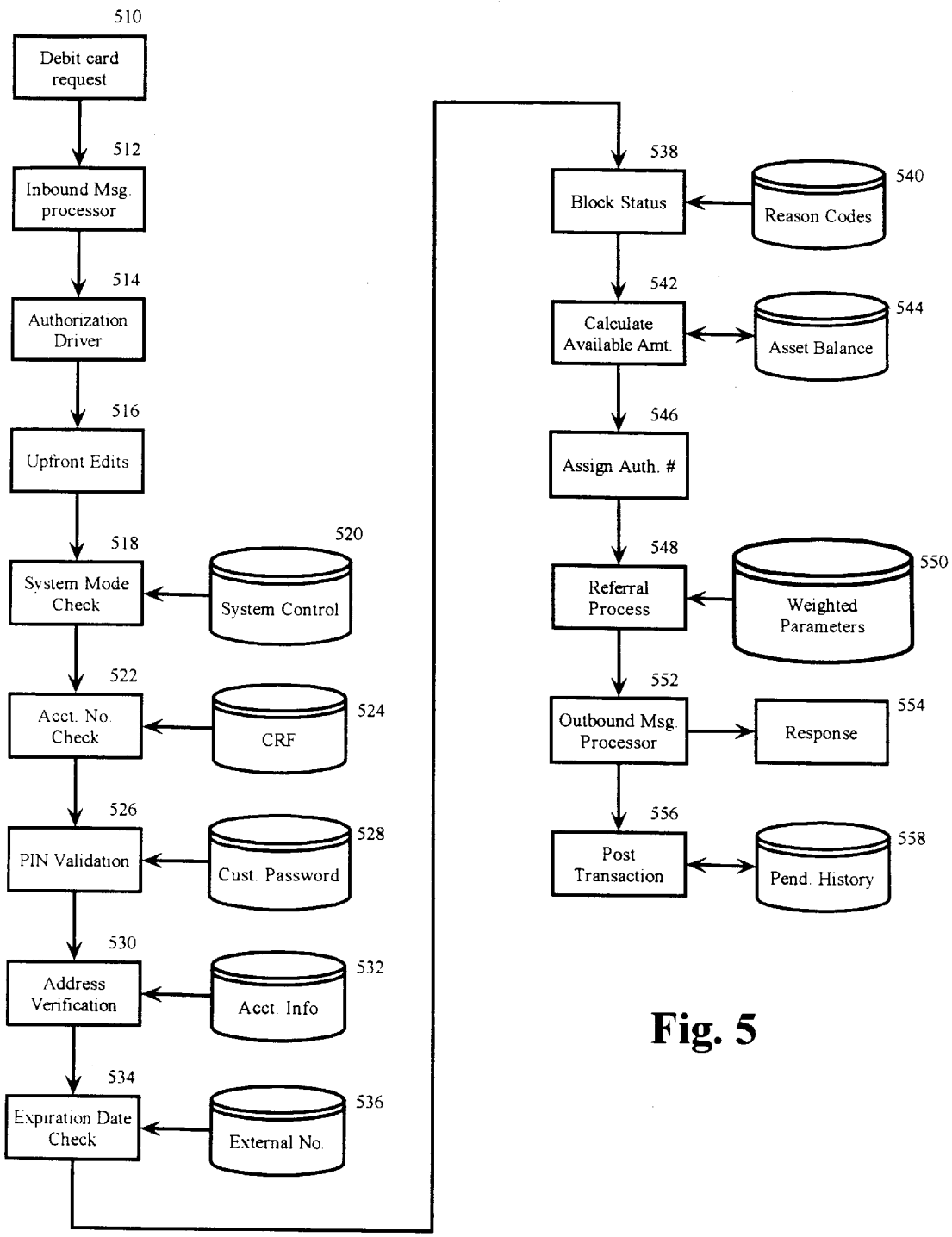
FIG. 5 is a functional flowchart of an example authorization process of the present system.
Figure 6:
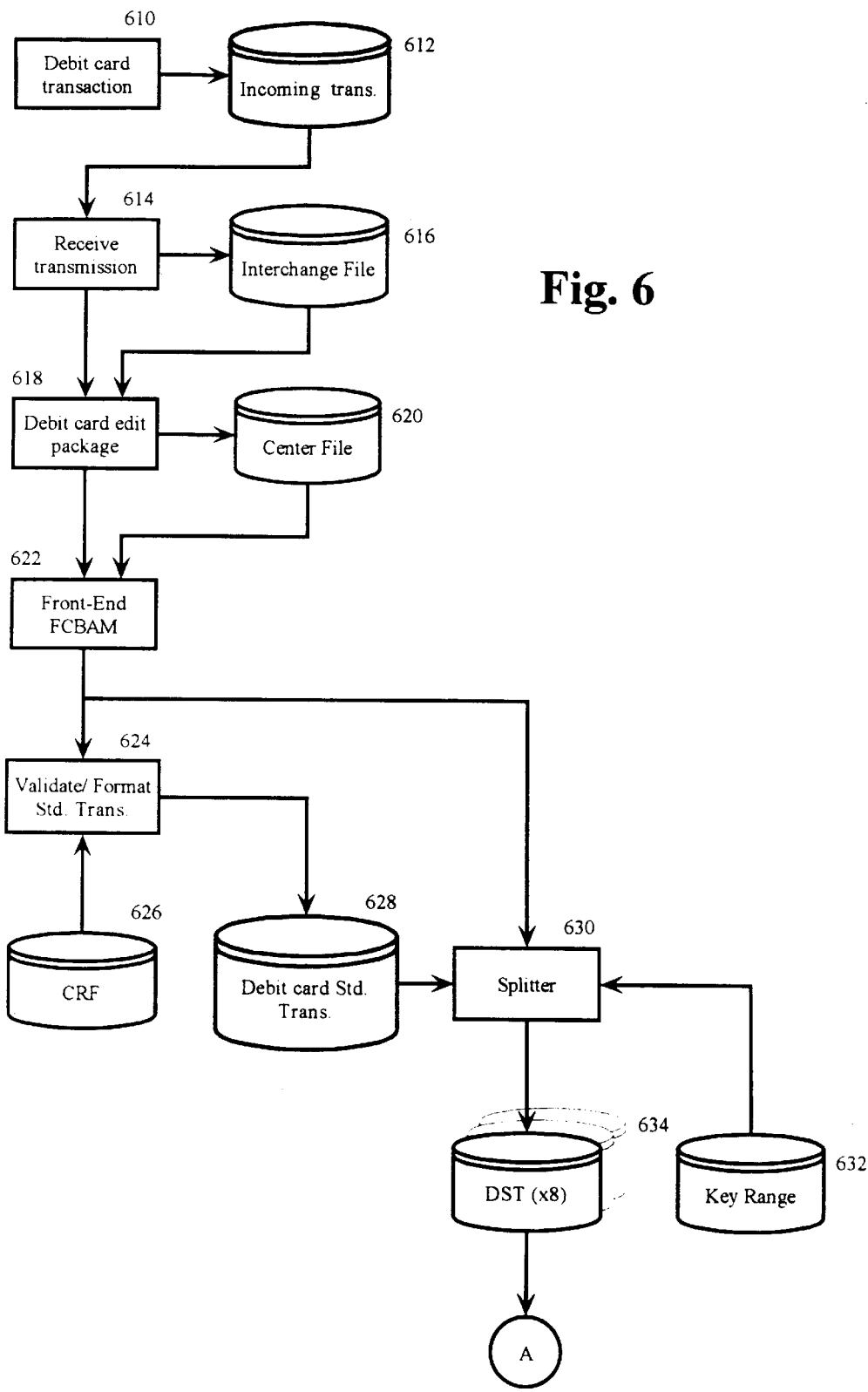
FIG. 6 is a functional flowchart of an example vendor settlement process of the present system.
Figure 7:
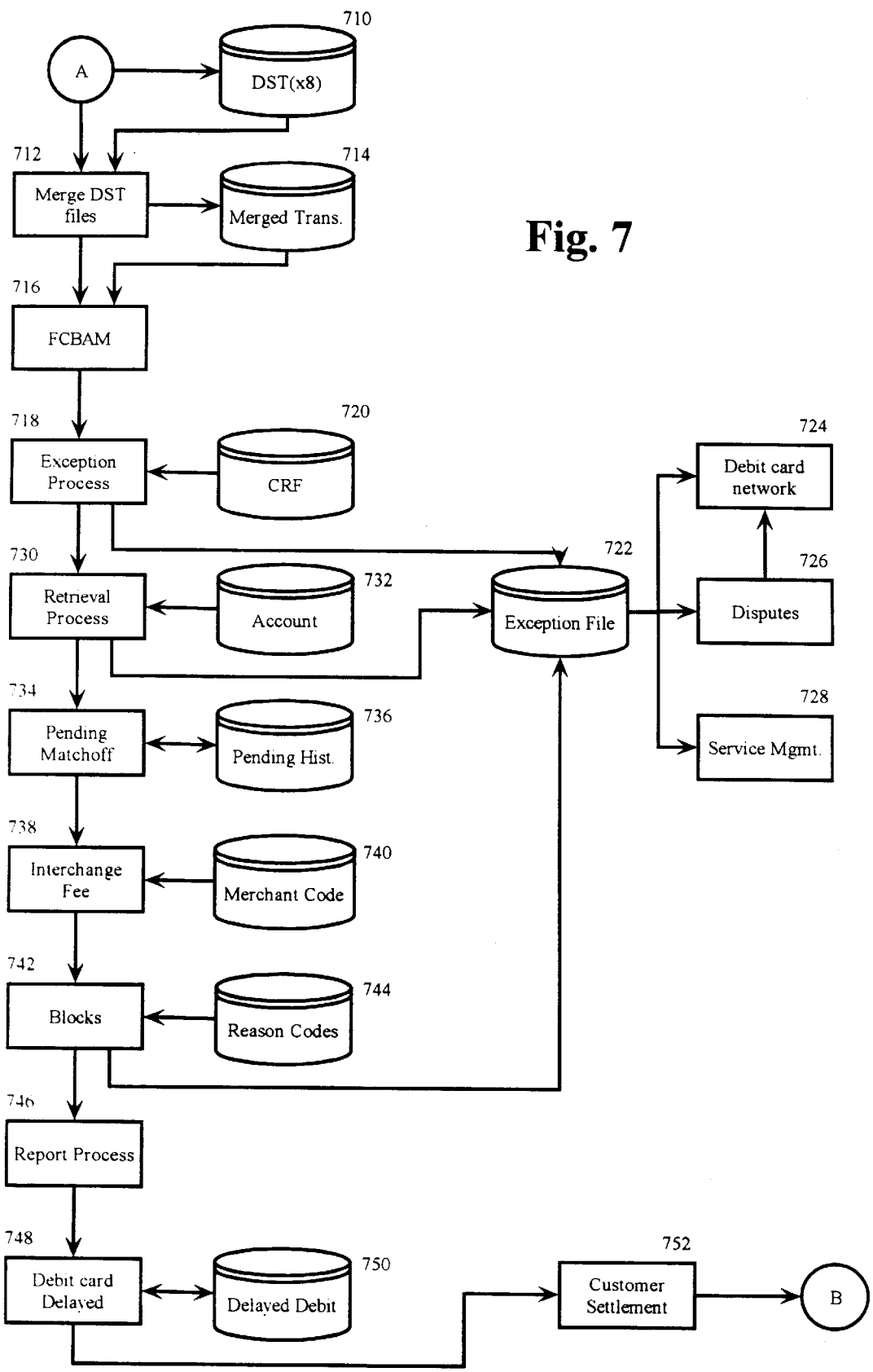
FIG. 7 is a functional flowchart of an example institution settlement process of the present system.

Referring now to FIG. 5, an FI account holder makes a retail purchase at a department store using the debit card. A request (block 510) is initiated through the debit card network which routes the message request to the present system at the FI for approval or decline and response back to the network and ultimately back to the retailer. Stage 1 includes the program processes and databases used in the authorization process. As mentioned above, the authorization process is one of the few transactions that is not processed through the various layers of the system. This is due to the need for immediate responses for authorization. While the overall system of the present invention is greatly improved in terms of speed and efficiency, authorization must take place within a few seconds. Thus, the initial authorization is processed separately, while the remaining financial transaction based on the authorization is processed through the various layers.

An inbound message processor (block 512) accepts the message from the debit card network and reformats the message fields for internal system use. The processor also creates a type of Standard Transaction—the Authorization Standard Transaction (AST)—from the reformatted fields. The AST is then forwarded to an authorization driver (block 514), which establishes a processing path depending on the type of Authorization request (such as debit card, ATM, funds transfers, or Brokerage Authorization). The system then performs edits (block 516) on mandatory fields within the Standard Transaction, including checking the digits on the debit card account number.

Using global system control parameters (found in system control database, block 520), the system verifies its own current operating status (block 518) to determine if it is in Normal Mode, in which all requested processes will take place, or Limited Mode. This unique Limited Mode allows the transaction to be processed even though the resources, such as balance information databases, normally all available for authorization criteria, are reduced. This reduction in available databases may be caused, for example, by a schedule powerdown of the servers containing those databases or an unscheduled outage in a portion of the network. In Limited Mode, the system will temporarily rely solely on the account status, i.e., whether the card is on an alert list or blocked, rather than actually calculate if the customer has sufficient available assets for the transaction.

The CRF database (block 524) is then accessed to verify that the debit card account number for the requested transaction exists on the FI account database (block 522). A unique identifier (UID) on the CRF is used to internally process and access databases in the subsequent processes needed to complete the business event. As discussed above, the use of the UID significantly increases efficiency, by reducing the complexity of cross-references in the various databases and therefore simplifying database access by reducing the number of required lookups. If needed, any PIN information or address verification (blocks 526, 530) will be performed by accessing a password or account database (block 528, 532), respectively. If either the PIN or address information entered with the transaction request is invalid, the request is rejected.

The transaction date of the request is then compared to the expiration date (block 534) of the External Number Info database (block 536). If the card is expired, the request is declined. The internal financial institution records are also checked (block 538) to verify the account status and card status to make sure that neither is blocked. If either is blocked, a reason code based on the status is retrieved from the reason code database (block 540) and returned to the requester.

In normal mode, the system determines (block 542) if there are sufficient assets in the customer's account (block 544) to satisfy the transaction request amount. If not, the transaction is declined. If so, the authorization process continues and the system updates the financial balances in the Account Asset Balance database for that customer (block 544). To uniquely identify the approved request for an subsequent matchoff with the financial draft, the system assigns a unique authorization number to the transaction (block 546), which is returned to the requestor with the authorization. Assuming that the transaction request has succeeded through all other authorization checks, the final check is to prevent exposure by the financial institution due to misdeeds such as fraud or theft. Using a set of parameters stored in the Weighted Parameters database (block 550), the system determines if too many requests have occurred in a certain time interval, or if too much overall funds have been requested over that time (block 548). If so, the system refers the transaction to customer operations personnel, who can make an informed decision as to whether the individual transaction should be approved, or the account should be blocked, or further investigation is warranted. One aspect of the system is that the Weighted Parameters database may be adjusted for each customer by the operations personnel using an online menu driven system. Previously, any changes to the fraud prevention parameters required programmers to alter the code of the system. For example, if a customer alerts the operations personnel that they will be making several significant purchases in the coming days, such as if he or she is taking a vacation, a operations officer can alter that persons parameters to avoid triggering referrals from just a few transactions.

If the request has passed all of the various checks described above, the outbound message processor (block 552) accepts the authorization standard transaction and reformats any internal information formats into the required outbound message format. The response to the request for authorization is then sent back to the debit card network (such as VISA) (block 554) for transmission to the merchant. The pending transaction as authorized is then written (block 556) to the Pending History database (block 558) for use in a subsequent matchoff process in the ultimate settlement of the transaction.

Stage Two

The second stage of transaction processing in the example involves financial settlement with the various parties involved with the transaction. Specifically, this involves three different settlement processes that are shown on FIGS. 6–8.

Vendor Settlement

The system uploads the interchange file created and sent by the debit card network (block 610) from a buffer database of incoming transmissions (block 612; also see block 328). The interchange file received (block 614) and stored (block 616) contains the financial draft of the transaction authorized during Stage One. According to the requirements for a debit card transaction, software algorithms provided by the debit card company are performed on the interchange file (block 618) to perform various interchange fee calculations, settlement and controls reporting. This then generates an FI center file for further processing (block 620). Blocks 610–620 are considered within the External Interface Layer of the system.

The File Control Batch Application Module (FCBAM) (block 622) then accepts the center file and acts as a traffic cop by forwarding information from the file to appropriate processes, which return responses and control to the FCBAM for further input transactions on the file, if necessary. The FCBAM is within the Transaction Control layer of the system. In batch mode, in which the settlement example is processed, the FCBAM is repeatedly involved in transferring the transaction data, as described below. For example, the FCBAM forwards the input file information to a process for validating and formatting the transaction file (block 624). This includes various file validations, such as formatting the headers and trailers and field edits (for example, checking the correct number of digits in the debit card number). The formatting process also includes retrieving the UID for the FI customer involved in the transaction from the CRF (block 626), which is important to the efficient processing in the remaining settlement transactions. The process further reformats the entire input transaction into the Debit Card Standard Transaction (DST) format (block 628). Blocks 624–628 are considered within the Transaction Translation layer of the system.

The DST is then written to one of a number of files for concurrent processing by the system. This improves the performance of the overall system since it is not necessary to process each DST sequentially. The DSTs are preferably split into eight files (block 634), although any number is contemplated, by a splitter process (block 630), which depends on the UID to direct the DST into one of the eight files. The Key Range database (block 632) includes the ranges of UIDs for each split for each type of transaction. Thus, the splitter process only has to access the Key Range database, find within which split the current transaction's UID occurs and write the transaction to that split. By using the UID, the number of transactions written to each split remains relatively constant. If any of the splits becomes particularly burdened over time, for example, if the number of UIDs increases and all of the new ones fall into one split, the key ranges can be easily adjusted to compensate. Once split, each DST file is then passed to the transaction settlement processes, which each split file is processed independently and concurrently with the others.

Transaction Settlement

The transaction settlement will be described with respect to a single DST file (block 710), although it is to be understood that the other split files will undergo settlement processes concurrently. In addition to transactions input to the DST file, the transaction settlement process merges (block 712) input transactions from the following modules: Disputes, Account Maintenance and FI online banking transactions. Transactions are then sorted in a merged transaction database (block 714) according to the UID and the type of transaction to satisfy any desired sequencing priorities, such as processing credits before debits. One of the benefits gained through the use of the UID is greater efficiency and speed in processing, since tables that are referenced during processing of another table are automatically in the same general order—sorted by UID. This applies regardless of the type of transaction or account type. By keeping the next accessed row of data in a database table in closer proximity to the previously accessed row, the overall data retrieval rate, and thus, the processing rate, will be improved.

With previous systems, tables indexed by the same type of account number would enjoy somewhat efficient process, but referencing other types of tables, sorted by unrelated account or other numbers, would greatly decrease efficiency.

The FCBAM (block 716) then forwards the transaction information to subsequent processes (BAMs) as described previously. After the various BAMs have completed processing a particular DST and control returns to the FCBAM, the next DST is forwarded similarly. As described above, the various BAMs are within the business application layer of the system. For reconciliation purposes, the FCBAM also tracks transaction counters and financial totals.

To direct the transaction information to appropriate BAMs, which is often dependent on the outcome of a previous BAM's processing, the system includes a Dynamic Navigation module, which represents the function navigation layer of the system.

At block 718, the BAM for exception processing accesses the CRF (block 720) using the UID of the transaction to obtain the status of the account. If any exception conditions are encountered, the Dynamic Navigation process will alter the preset navigation path for processing a valid DST. Instead, the exception DST is routed to the exceptions file (block 722), which is itself routed to Disputes (block 726) for investigation and chargebacks through the debit card network (block 724), as well as to the Service Management process (block 728), which logs and tracks tasks.

Assuming there is no exception condition, the Account database (block 732) is then accessed using the UID to retrieve (block 730) the FI account number (i.e., the number associated with the actual debit card account, not the customer's overall UID). If an exception occurs, such as if the account number is invalid, the Dynamic Navigation module forwards the transaction to the exceptions file (block 722), which is processed as above. The Pending History database (block 736) is accessed to retrieve the pending transaction created and stored during the authorization on day one. Assuming a match, the pending transaction is then erased from the Pending History database as settled (block 734) and replaced with a matched transaction, which is stored on a transaction history database for a set period of time for record-keeping purposes.

At block 738, classification of Interchange fees is calculated internally with reference to the merchant codes (block 740) and reconciled against the fee calculations of the debit card network software. Revenue generated to marketing areas in connection with the debit card transaction is also calculated during this process. The system then checks the account status on the CRF and the account database to determine if the account is blocked for any reason (block 742). If so, the Reason Codes database is accessed (block 744, also seen at block 540) and the appropriate code is appended to the transaction. If an exception is encountered, the Dynamic Navigation module forwards the transaction to the exception file, which is described above.

The Report Process is shown at block 746, although the report utility of the system may be accessed at any time. The report utility is improved over previous systems in that the report generating is dynamic. Rather than generating a limited number of reports in set formats, the report utility generates output data files, which may then be formatted and reformatted as desired.

The final step before transfer of the transaction to customer settlement (block 752) is a determination if the transaction and the customer qualify for the "delayed debit" feature of the debit card program (block 748), in which the debit is not charged against the customer account balance until a pre-determined date, such as the fourth Wednesday of each month. Regardless, the system formats the transaction for posting to the Account Asset Balance and Ledger databases. If it is a delayed debit transaction, it is temporarily stored in the Delayed Debit database (block 750) for later posting. Otherwise, it proceeds immediately to customer settlement.

Customer Settlement

Figure 8:
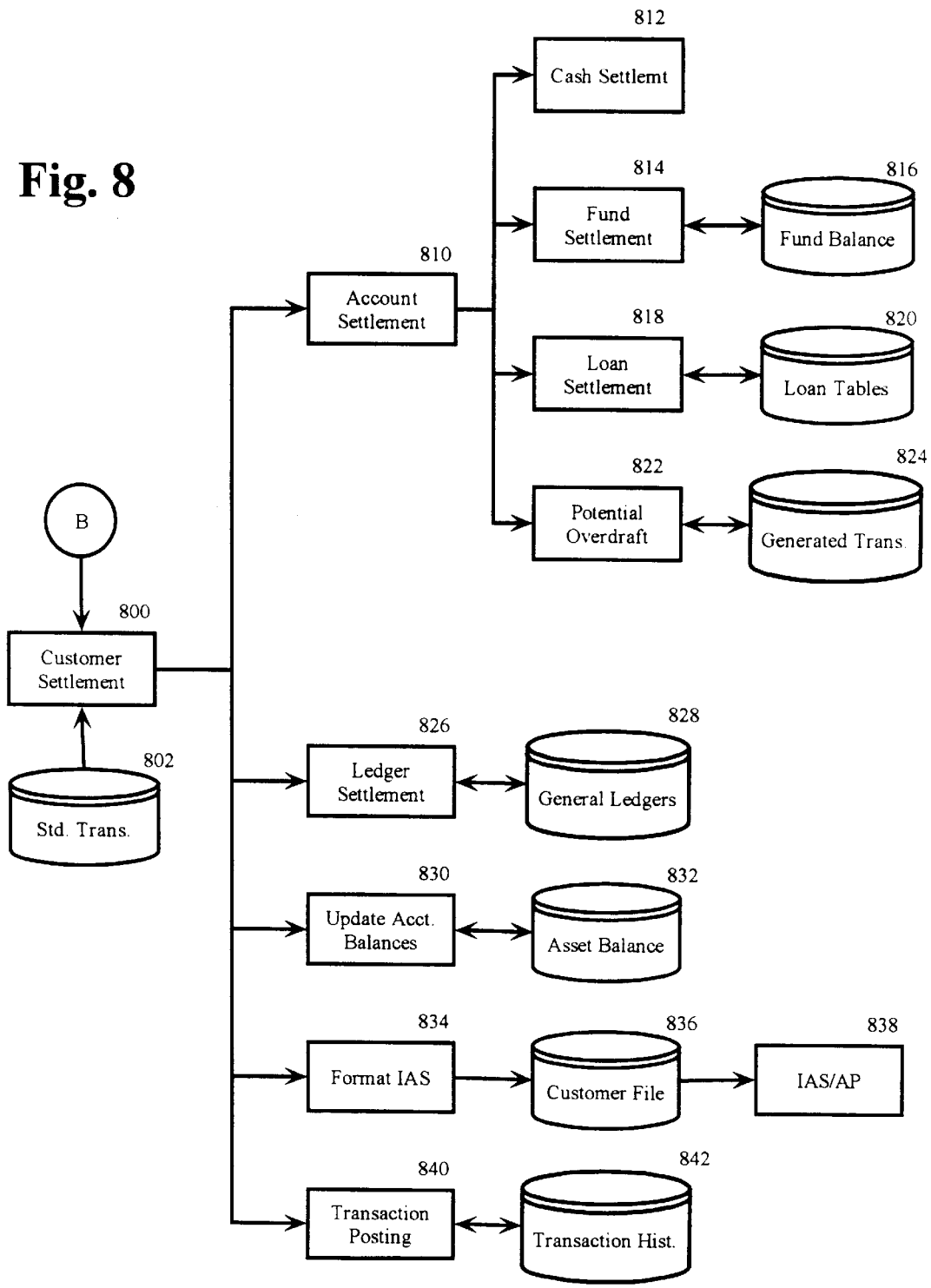
FIG. 8 is a functional flowchart of an example customer settlement process of the present system.

Referring now to FIG. 8, the final stage of settlement is shown, in which the transaction is ultimately settled and charged against the appropriate account of the customer. The standard transaction is received from the institution settlement (block 802) by the customer settlement process (block 800). Five BAMs are processed in sequence to complete the settlement process: Account Settlement, Ledger Settlement, Update Account Balances, Format IAS/AP, and Post Transaction History. The Account Settlement BAM (block 810) determines exactly how the transaction will be settled against the customer's available assets. The BAM is programmed with a set of priorities, such as cash (block 812), funds (block 814), loans (block 818) or potential overdraft (block 822), in that order, to determine from where the transaction amount will be applied. The system stores a set of priorities for each customer, which may be modified to fit each customer's individual desires. Using the UID associated with the transaction, the Account Settlement BAM retrieves the amount available in each successive customer account (i.e., from the fund balance (block 816), the loan tables (block 820) or the generated transaction (block 824) databases) until sufficient assets are located.

The Ledger Settlement BAM (block 826) then records the transaction with the necessary entries in the General Ledger Entries database (block 828), based on whichever account the Account Settlement BAM returned as having a sufficient balance. The Update Account Balances BAM (block 830) then updates the financial fields in the Account Asset Balance database (block 832) with information contained in the standard transaction. The updated information is available for viewing online within the time it takes to run the batch processes (in this example, all processing occurring within FIGS. 6–8). Under previous systems, such information would be unavailable until after the batch processing was accomplished—traditionally after midnight to avoid overloading and slowing down the system. With the improved capability of the system, the batch processes run throughout the day. Thus, in the example shown, the information would be available within approximately two hours.

At block 834, the system formats the completed transaction into the internal accounting system format, forwards it to the customer file (block 836) and then to the Accounts Processing system (block 838). At block 840, the financial information from the DST is written (block 840) to the Transaction History database (block 842). As with the Asset Balance database (block 832), the information will be updated and available for retrieval when the batch processing is completed. In the preferred embodiment, this is approximately two hours.

Conclusion

As described above and illustrated in the above example, the system achieves significant advantages over previous systems. Use of the UID as a cross-referencing and access tool increases the speed and efficiency of the system, while permitting system simplicity with greater customer account complexity. The system is also highly flexible, as shown by the ease of adjusting account parameters.

While the above-described embodiments are fully capable of achieving the objects of the invention, it is to be understood that these embodiments are shown and described for the purpose of illustration and not for the purpose of limitation, the invention only being limited by the following claims:

What is claimed is:

1. A system for processing financial transaction data for multiple accounts of multiple customers, comprising:

central reference means for assigning and storing a unique identifier for each customer, said central reference means also associating said accounts of said each customer with the respective unique identifier;

external interface means for receiving transaction data from a source external to said system;

reformatting means for manipulating said external transaction data, said reformatting means also retrieving said unique identifier from said central reference means and inserting said unique identifier into said transaction data; and computer means upon which said central reference means, external interface means and reformatting means are all located, said computer means being connected by a network to other computers for receiving said transaction data.

2. The system as in claim 1, further comprising:

means for processing multiple sets of transaction data concurrently, said means for processing comprising a plurality of databases for storing transaction data and a processing module for each of said databases, said transaction data being segregated into said databases according to said unique identifier of said transaction data.

3. The system as in claim 1, wherein said central reference means further comprises cross-referencing means for associating a customer's unique identifier with all of said customer's accounts on said system.

4. The system as in claim 3, further comprising:

account database means for storing account information for each of said accounts according to said unique identifier.

5. The system as in claim 1, further comprising:

means for dynamically storing a set of parameter information for each of said customer accounts, said parameter information being alterable by an operator of said system.

6. The system as in claim 5, wherein said parameter information comprises usage parameters for use in triggering fraud and theft prevention alerts.

7. The system as in claim 1, wherein said reformatting means further reformats said transaction data from one of a plurality of external formats into a standard format.

8. The system as in claim 7, wherein said transaction data is received from a plurality of remote systems.

9. The system as in claim 7, wherein said transaction data is received from a plurality of workstations connected to said system through a network.

* * * * *